April 28, 1925.

C. BARBIERI 1,535,757

SUNDAE CUP FORMING MACHINE

Filed Sept. 25, 1922   9 Sheets-Sheet 1

April 28, 1925. 1,535,757

C. BARBIERI

SUNDAE CUP FORMING MACHINE

Filed Sept. 25, 1922 9 Sheets-Sheet 3

April 28, 1925.

C. BARBIERI

1,535,757

SUNDAE CUP FORMING MACHINE

Filed Sept. 25, 1922    9 Sheets-Sheet 7

Patented Apr. 28, 1925.

1,535,757

UNITED STATES PATENT OFFICE.

CESARE BARBIERI, OF NEW YORK, N. Y., ASSIGNOR TO THE VORTEX MFG. CO., OF CHICAGO, ILLINOIS, A CORPORATION OF ILLINOIS.

SUNDAE-CUP-FORMING MACHINE.

Application filed September 25, 1922. Serial No. 590,265.

*To all whom it may concern:*

Be it known that I, CESARE BARBIERI, a subject of the King of Italy, and a resident of the city of New York, in the county of New York and State of New York, have invented certain new and useful Improvements in a Sundae-Cup-Forming Machine; and I do hereby declare that the following is a full, clear, and exact description of the same, reference being had to the accompanying drawings and the numerals marked thereon, which form a part of this specification.

This invention relates more particularly to an improved type of a multiple automatic cup forming machine, especially adapted for manufacturing conical sundae cups and having attachments whereby the formed cups are first adapted to be automatically removed from a forming mechanism and delivered into a position to be stacked nested one within the other below retaining means with the folded portions of adjacent cups staggered to permit the formation of a straight stack of cups between suitable guards.

It is an object of this invention to provide a machine which will automatically form conical paper sundae cups from prepared blanks and discharge the cups into a conical holder adapted to be rotated each time a cup is received so that the folder portions of the cups will be staggered in order to permit the formation of a straight stack of cups instead of a stack wherein the folded portions of the cups register one with the other to produce a stack which will assume a curved formation and be exceedingly hard to handle.

It is also an object of the invention to provide a machine adapted to form conical cups from blanks and then push the cups down into a rotatable receiver below resilient retainers which serve to hold the cups nested one within the other between suitable guards.

It is a further object of this invention to provide a machine wherein cups formed from blanks are adapted to be delivered over a stacking mechanism and then pushed into said mechanism below retaining members which serve to hold the cups pressed one within the other to prevent the folded portions of said cups from springing the cups out of proper nested relation with one another.

It is furthermore an object of this invention to provide a cup receiving mechanism having a cup support adapted to be automatically lowered and rotated each time a cup is delivered thereto.

Another object of the invention is to provide a cup forming machine with an automatic stacking attachment which will deliver a formed cup from the cup formers into a position to permit the same to be pushed between resilient retainers down into seated engagement with previously formed cups supported between guards upon a rotatable holder adapted to be lowered a predetermined distance and rotated a fraction of a revolution each time a cup is delivered thereto.

It is also an object of the invention to provide a sundae cup forming machine wherein means are provided for removing a cup from forming means and pushing said cup into position wherein a reciprocating rod is adapted to engage the cup at a predetermined time and force the same downwardly through a receiving ring below retaining means and into a holder adapted to be lowered a predetermined distance and partially rotated each time a cup is delivered thereto.

A further object of the invention is to provide a machine adapted to automatically remove blanks from a magazine, deliver the same properly centered to a forming means to be formed into a cup which is automatically delivered into an automatic stacking attachment whereby the formed cups are nested one within the other with the folded portions of the cups staggered to form a straight stack of cups adapted to be conveniently removed from the stacking attachment and placed in cartons.

It is an object of this invention to provide a cup stacking attachment for a cup forming machine, said attachment having means for holding nested cups from springing apart as the stacking process takes place.

Another object of the invention is to provide a cup forming machine with a stacking attachment operable from the machine and having mechanisms for automatically lowering and rotating a cup holder predetermined amounts each time a cup is delivered thereto.

It is an important object of this invention to provide an improved multiple cup forming machine wherein each of the units is driven from a common source and is adapted to automatically feed blanks into a forming mechanism adapted to form cups and crease the folded portion thereof and then remove the formed cups from the forms and automatically stack said cups in straight stacks with the folded portions of the cups staggered.

Other and further important objects of this invention will be apparent from the disclosures in the drawings and specification.

The invention (in a preferred form) is illustrated in the drawings and hereinafter more fully described.

The reference numeral 1 indicates a drive shaft adapted to be operated from any convenient source of power and supported on a framework 2. The entire machine is of the multiple type made up of a plurality of units driven from a single source. Only one of the units is illustrated and described. The drive shaft 1 has a pinion 3 secured thereon and meshing with a large gear 4 supported on a bearing sleeve 5. Fixed on the sleeve 5 to rotate with the gear 4 is a pinion 6. The pinion 6 meshes with a large gear 7 which drives a cam shaft 8 through a clutch mechanism 9 operable by a control lever 10 pivoted at one end to a bracket 138 and intermediate its ends to a slidable shaft 139 common to all the units. Rotatable upon the cam shaft 8 is a sleeve 11. A control clutch may be provided for each unit of the machine if desired.

Keyed on the cam shaft 8 inside of the machine frame 2 is a gear 12 meshing with a gear 13. The gear 13 is secured on a stub shaft 14 which is journalled in bearings at one end of the frame. Secured on the outer end of the shaft 14 is a disk 15 having a roller 16 mounted on the periphery thereof to coact with a four-point Geneva gear 17. The Geneva gear 17 is fixed on the outer end of a shaft 18 supported by the machine frame and having a gear 19 keyed thereon. The gear 19 meshes with a pinion 20 fixed on one end of a longitudinal driving shaft 21 supported in suitable bearings 22 on the machine frame. Fixed on the shaft 21 is a beveled gear 23 which drives a bevel gear 24 which operates the folding or forming mechanisms of the machine.

Figure 23:
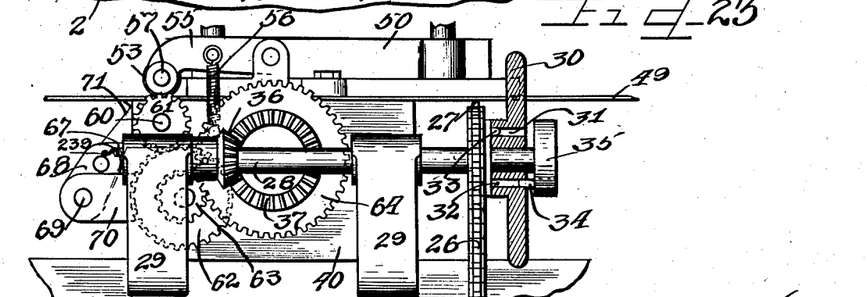
Figure 23 is an enlarged detail section taken on line 23—23 of Figure 1 with parts shown in section and with parts omitted.

Mounted on the cam shaft 8 is a sprocket wheel 25 around which an endless chain 26 is trained. The chain 26 is also trained around a smaller sprocket wheel 27 rotatably mounted on a shaft 28 supported in suitable bearings 29. The sprocket wheel 27 has a drive pin 33 thereon which projects into a passage 31 provided in the hub of a clutch hand wheel 30. The hand wheel 30 is also provided with a passage 32 into which a longer pin 34 projects. The pin 34 is fixed on a knob 35 secured on one end of the shaft 28. A drive is imparted from the sprocket wheel 27 to the shaft 28 through the pins 33 and 34 when the hand wheel 30 is engaged with the sprocket wheel pin 33 as illustrated in Figure 23. The clutch hand wheel 30 affords a quick release for the blank feed mechanism of the machine by simply sliding the hand wheel 30 against the knob 35 and out of engagement with the drive pin 33.

Figure 24:
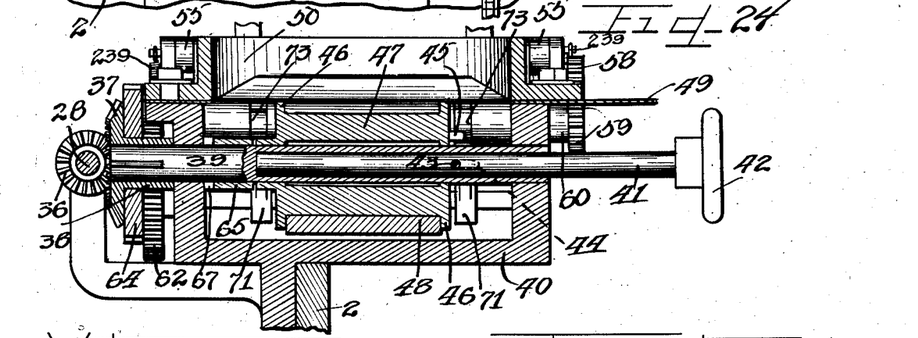
Figure 24 is an enlarged detail section taken on line 24—24 of Figure 1 with parts shown in elevation and with parts omitted.

The blank feeding mechanism is operated by a small beveled gear 36 fixed on the shaft 28 and meshing with a larger bevel gear 37. The large bevel gear 37 is provided with an integral sleeve 38 which is keyed on one end of a shaft 39 journalled in a box section 40 forming a part of the machine frame. One end of the shaft 39 is hollow to receive a slidable rod or bar 41 having a knob or handle 42 fixed on the outer end thereof. Secured diametrically through the rod 41 is a drive pin 43, the ends of which project through slots 44 provided in the shaft 39 (Figure 24). The slots 44 limit the telescoping movement of the rod 41 in the shaft 39 whereby the blank feed mechanism may be quickly released in case of emergency. The pin 43 is adapted to coact with a pin 45 to cause rotation of a blank feed reel on which said pin 45 is mounted. The blank feed reel is rotatably supported on the shaft 39 within the box 40 and comprises a pair of spaced circular plates or disks 46 connected by bars 47. Supported on one of the reel bars 47 between the disks 46 is a curved blank feed friction pad or block 48 made of rubber or other suitable material. The feed pad 48 extends around only a portion of the periphery of the reel so as to operate upon a paper cup blank to be fed only at a predetermined time.

Mounted on the machine frame is a table 49 having an opening therein, above the box 40, through which the feed reel is adapted to act upon cup blanks which are supported in a circular magazine 50 mounted on the table 49 above the opening. Supported in the box section 40 is a bracket 51 holding a pin 52 which projects through the plate opening to afford a support for the stack of cup blanks within the magazine. A pair of blank feed rollers 53 and 54 are provided to engage blanks therebetween fed thereto by the feed reel friction pad. The upper feed roller 53 is supported in pivoted bearing arms 55 which are held in lowered position by means of coiled springs 56. Fixed on one end of the upper roller shaft 57 is a pinion or gear 58 which is in mesh with a gear 59 supported on one end of the lower roller shaft 60 journalled in the box 40. Fixed on the other end of the lower roller shaft 60 is a gear 61 which is in mesh with a gear 62 supported on a stub shaft on the box 40. Also fixed on said stub shaft adjacent the gear 62 is a small gear 63 which is in mesh with a large gear 64 fixed on the sleeve 38 of the bevel gear 37.

Fixed on the shaft 39 adjacent one end of the feed reel is a cam 65 adapted to coact with a roller 66 supported on one side of a bar 67 having a slot in one end thereof to permit the bar to slide transversely on the shaft 39. The other end of the bar 67 is pivoted to one end of a crank 68 fixed on a rocker shaft 69 supported by brackets 70. Secured on the rocker shaft 69 are a pair of pusher arms 71 which operate together to engage a cup blank after it passes between the feed rollers 53 and 54. The upper ends or tips of the pusher arms 71 operate in spaced parallel slots 72 provided in the machine table 49. The lower feed roller 54 is provided with spaced peripheral grooves 73 adapted to receive the pusher arms 71 when in retracted position. Positioned on the top of the table 49 are a pair of spaced rollers or stops 74 against which the cup blank is adapted to engage when pushed over the table by the pusher arms 71. Secured on the table 49 between the stops 74 is a shoe 136 having an enclosed surface 137 up which the advance edge of a blank is adapted to slide.

The shaft 21 is intermittently rotated by the action of the four-point Geneva gear 17 and the cup forming mechanism is driven thereby through the bevel gears 23 and 24. The forming mechanism is mounted on a shaft 78 journalled in bearings 75 and said shaft has the bevel gear 24 fixed on the outer end thereof. Also supported on said forming shaft 78 is a clutch mechanism 76 and an adjusting hand wheel 77 for operating the same by means of which the forming elements of the various units may all be brought into proper timed relation with the feeding means similar to the arrangement disclosed in my copending application for patent for a "multiple automatic folding machine", filed September 10th, 1921, Serial No. 499,614. The shaft 78 extends toward the front part of the machine and is provided with a pivot pin 79 (Figure 13) which extends therethrough. Mounted on the pivot pin 79 are two gripper holder members 80 adapted to cooperate with each other and each having attached to its outer or forward end a forwardly extending gripper plate 81. The gripper plates 81 are preferably in the form of flat triangular plates and are attached to the holding members 80 by rivets, screws or other suitable means. The gripper holder members and the gripper plates 81 are normally held in close contacting position by means of a spring 82 having its ends attached to pins fixed on the holder members. The gripper plates 81 are adapted to be separated at predetermined times in order to permit of the insertion of a blank therebetween. Adapted to cooperate with the gripper plates 81 is a forming member 83 of a semi-conical shape. The forming member 83 is provided with two rearwardly extending arms 84 pivoted to the opposite sides of one of the bearings 75. A cross bar 85 connects the two pivoted arms 84 and said bar has supported thereon a Z-bracket 86, the lower arm of which engages the upper gripper holding member 80 in such a manner that when the forming member 83 is elevated about its pivot 87, the gripper plates 81 are separated against the tension of the spring 82. The bracket 86 is held in place by a screw bolt 88. Projecting through an opening in the upper flange of the Z-bracket 86 is a stem 89, the lower end of which is threaded into the cross bar 85. The stem 89 has the upper end secured in an arm 90 adjustably supported on a vertical rod 91 by means of a set screw 92. The rod 91 is rigidly supported on the front bearing 75. A coiled spring 93 is engaged around the stem 89 below the arm 90. A nut 94 is provided on the stem 89 below the spring 93 to resiliently hold the forming member 83 in its lower position. Adjustably mounted on one of the arms 84 by means of set screws 95 is a slotted shoe 96.

Figures 4, 5, 6:
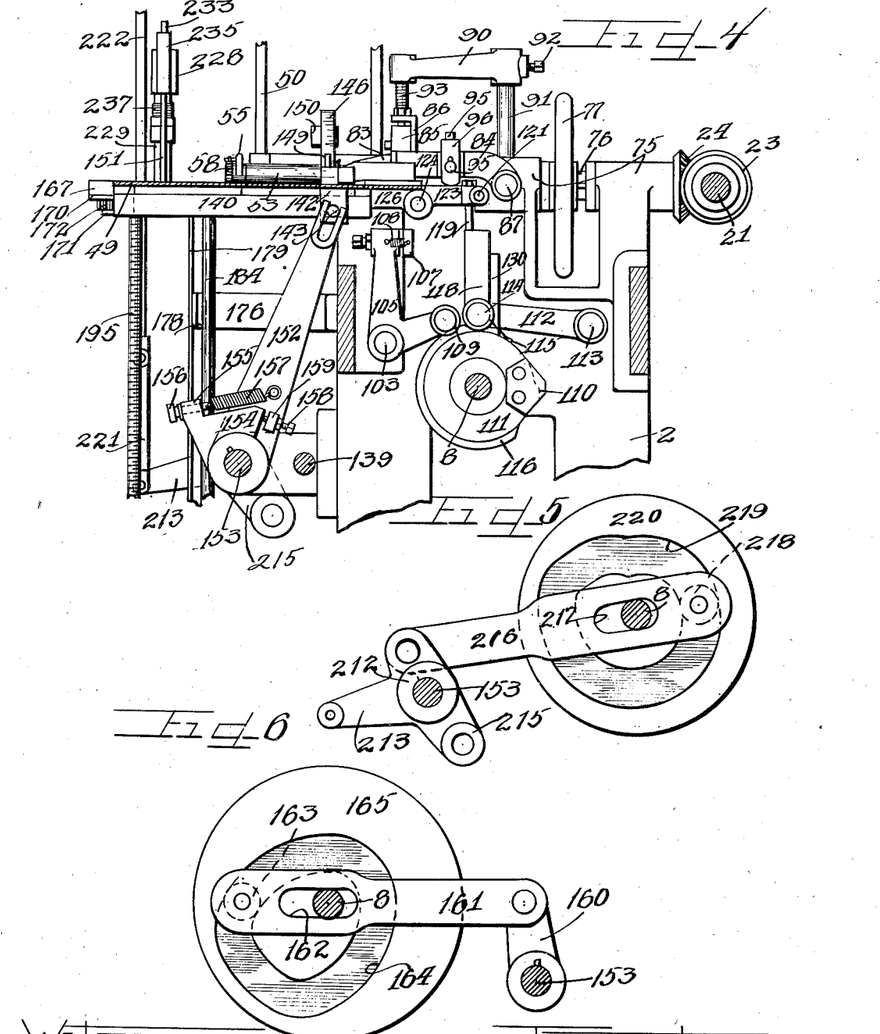
Figure 4 is a transverse sectional view taken on line 4—4 of Figure 1.
Figure 5 is a fragmentary detail section taken on line 5—5 of Figure 3.
Figure 6 is a fragmentary detail section taken on line 6—6 of Figure 3.

An additional blank positioning mechanism is provided and comprises a pair of arms 97 adapted to slide in slots 98 in the table 49. The upper ends of the arms 97 terminate in heads 99 on which positioning pins 100 are secured. The arms 97 have the lower ends thereof secured to a cross arm 101 integrally formed on the upper end of a crank arm 102, the lower end of which is fixed on one end of a stub shaft 103 journalled within a bearing 104 on the machine frame 2. Secured on the other end of the stub shaft 103 is a bell-crank 105 having a screw 106 adjustably mounted at the end of the longer arm to coact with a stop block 107 fixed on the machine frame. A spring 108 is connected to the longer arm of the bell-crank 105 and to the block 107 to resiliently hold the blank positioning arms 97 in retracted normal position and the screw 106 in engagement with the block 107 as shown in Figure 4. A roller 109 is mounted on the end of the short arm of the bell-crank 105 to coact with a cam 110 formed on a disk 111 mounted on the cam shaft 8.

Figures 11, 12, 13, 14:
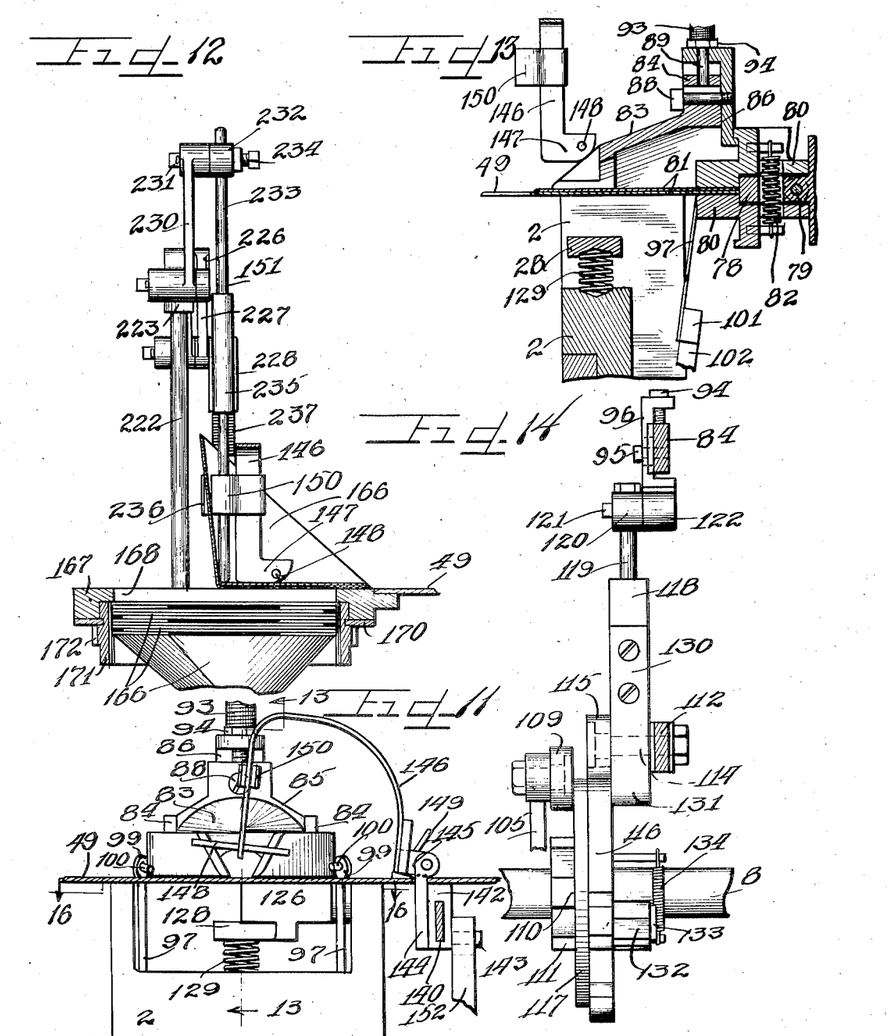
Figure 11 is a detail view taken on line 11—11 of Figure 1.
Figure 12 is an enlarged fragmentary detail section taken on line 12—12 of Figure 1 with parts in elevation.
Figure 13 is a detail sectional view taken on line 13—13 of Figure 11 with parts shown in elevation.
Figure 14 is an enlarged detail view taken on line 14—14 of Figure 3.
Figure 15:
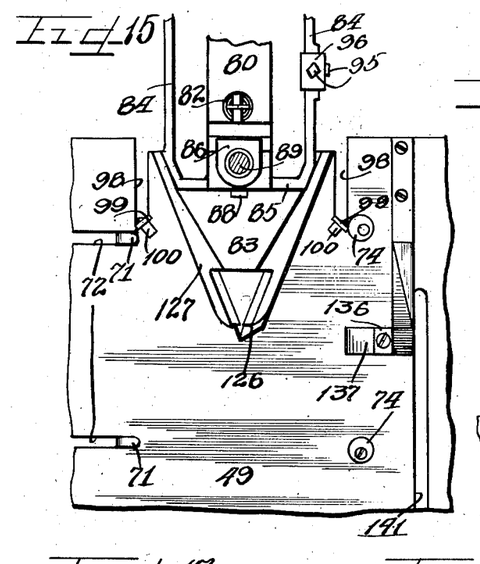
Figure 15 is an enlarged detail plan view taken on line 15—15 of Figure 2 with parts omitted.
Figure 16:
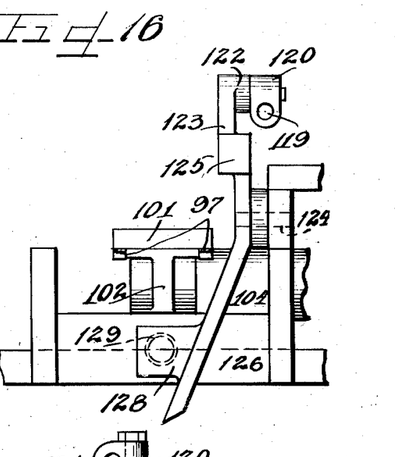
Figure 16 is a detail plan view taken on line 16—16 of Figure 11.
Figure 17:
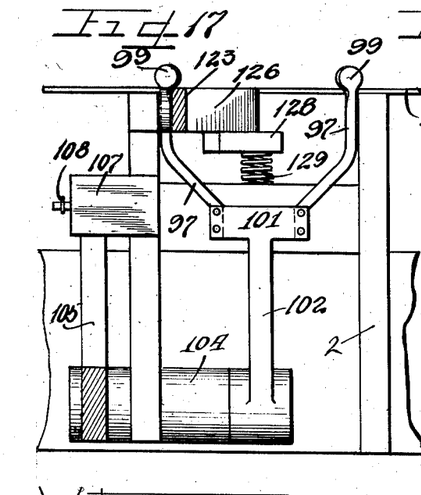
Figure 17 is an enlarged detail view taken on line 17—17 of Figure 1 with parts omitted.
Figure 18:
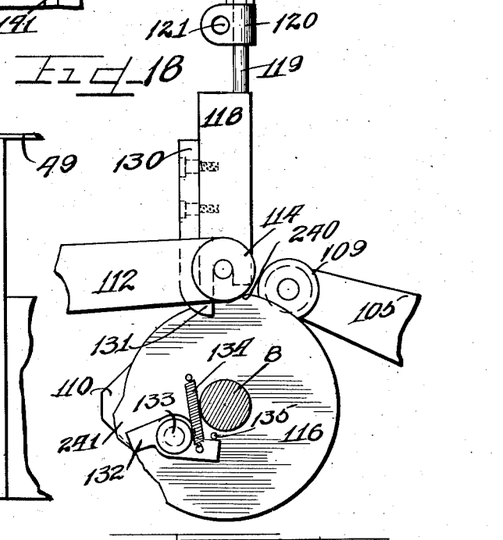
Figure 18 is an enlarged detail view taken on line 18—18 of Figure 3.
Figure 19:
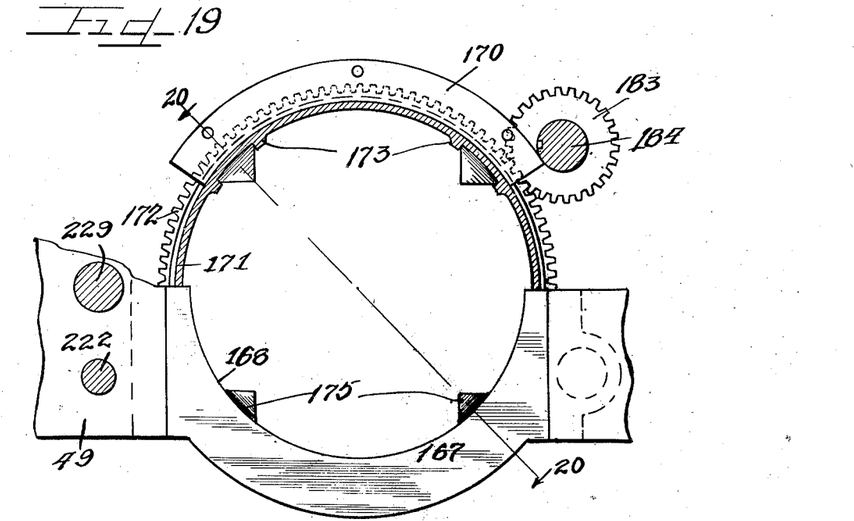
Figure 19 is an enlarged detail plan view taken on line 19—19 of Figure 7 with parts omitted.
Figure 20:
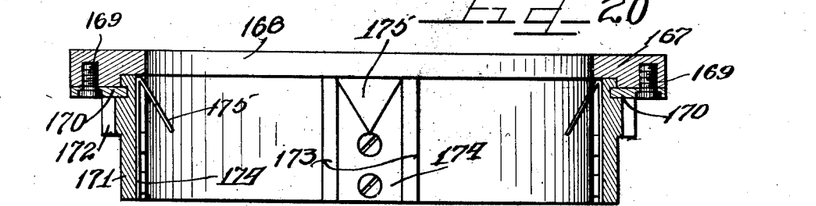
Figure 20 is a detail section taken on line 20—20 of Figure 19.
Figure 21:
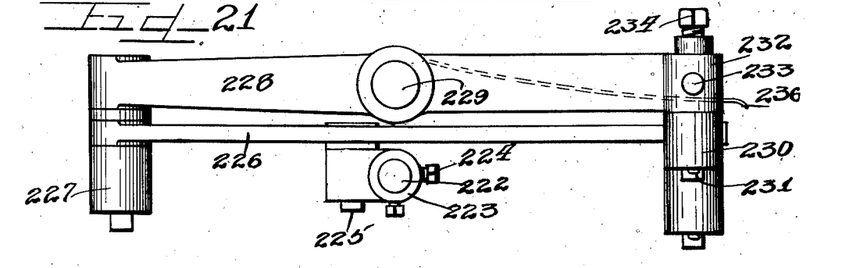
Figure 21 is an enlarged detail plan view taken on line 21—21 of Figure 7 with parts omitted.
Figure 22:
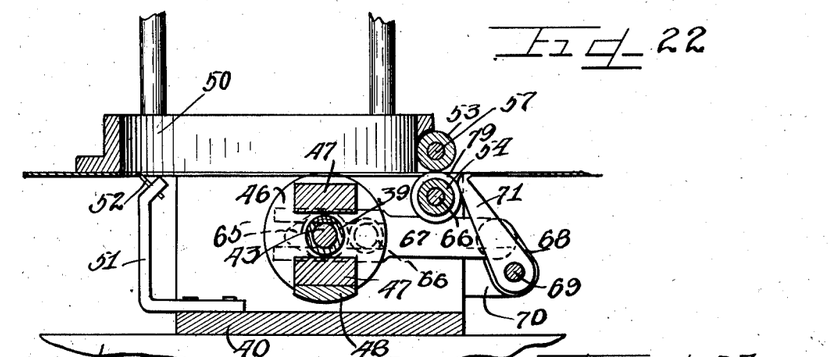
Figure 22 is an enlarged detail section taken on line 22—22 of Figure 1.

The means for lifting the forming member 83 is illustrated in Figures 4, 14 and 18 and consists of an arm 112 pivoted at 113 to the machine frame and having a pin 114 supported on the free end thereof for supporting a roller 115. The roller 115 is positioned to coact with a cam 116 supported on the cam shaft 8 and separated from the cam disk 111 by a spacer disk 117. Engaged on the pin 114 between the roller 115 and the arm 112 is the lower notched end of an upstanding bar or arm 118. A rod 119 is secured in the upper end of the arm 118 and fastened on said rod is a member 120 for supporting a pin 121.

Pivoted on the pin 121 is a boss 122 integrally formed on one end of a fulcrumed arm 123 pivoted to the machine frame on a pin 124. The fulcrumed arm 123 is provided with a boss 125 upon which the adjustable shoe 96 is adapted to rest to permit elevation of the forming member 83. Also integrally formed on the arm 123 is an inclined extension or presser arm 126 adapted to cooperate with a V-shaped opening or slot 127 in the table 49 which accommodates the triangular gripping plates 81 to properly form the paper cup and prevent excess paper from being pulled underneath the table when said gripping plates are rotated. A boss 128 is formed on the presser arm 126 against which the upper end of a coiled spring 129 presses. The lower end of the spring 129 is seated on a member forming part of the machine frame. Fastened to the upright arm 118 by screws or other suitable means is a bar 130 having a curved shoe 131 formed on the lower end thereof for coaction with one arm of a bell-crank 132 pivoted to one side of the cam 116 by means of a pin 133. A spring 134 is secured to the cam 116 and to the other arm of the bell-crank 132 and acts to normally hold the bell-crank 132 against a stop pin 135 on the cam 116, as illustrated in Figure 18.

A mechanism is provided for automatically delivering or transferring a formed cup from the forming mechanism to a stacking mechanism. The delivering or transferring mechanism comprises a horizontal stationary guide bar 140 supported on the machine frame below a transverse guide slot 141 in the table 49. Slidably mounted on the guide bar 140 is a block or shoe 142 on one side of which a pin 143 is secured. Fastened to the opposite side of the slidable shoe 142 is a plate 144 which projects upwardly through the table slot 141 and has a bracket 145 pivoted on the upper end thereof. A finger piece 149 is provided on the bracket 145 to permit the same to be manually tipped upwardly if desired. Secured to the pivoted bracket 145 is a curved or arched arm 146, the free end of which is provided with a rearwardly directed extension or foot 147 (Figure 13). Extending through the presser foot 147 is a cross piece or cup engaging bar 148 adapted to fit within a cup to push the same toward discharge position. Secured on the arched arm 146 is a guide fork 150 to provide a guide for a reciprocating cup discharge rod 151, the operation of which will be hereinafter more fully described.

Engaging the pin 143 of the slidable block 142 is the upper notched or forked end of a lever 152, the lower end of which is rotatably supported on a longitudinal shaft 153 common to all of the machine units. Keyed on the shaft 153 adjacent the reciprocating lever 152 is an arm or plate 154 provided with an extension 155 through which an adjustable screw member 156 is engaged. A coiled spring 157 connects the end of the screw member 156 to the lever 152 and serves to hold the arm 154 against an adjustable stop screw 158 supported an a boss 159 formed on the lever 152.

The shaft 153 has secured on one end thereof a crank 160 to which is pivotally connected one end of a connecting bar 161 having a longitudinal slot 162 through which the shaft 8 projects. Mounted on one side of the bar 161 is a roller 163 which is adapted to move in a cam groove 164 of a cam disk 165 keyed on the cam shaft 8.

Figure 1:
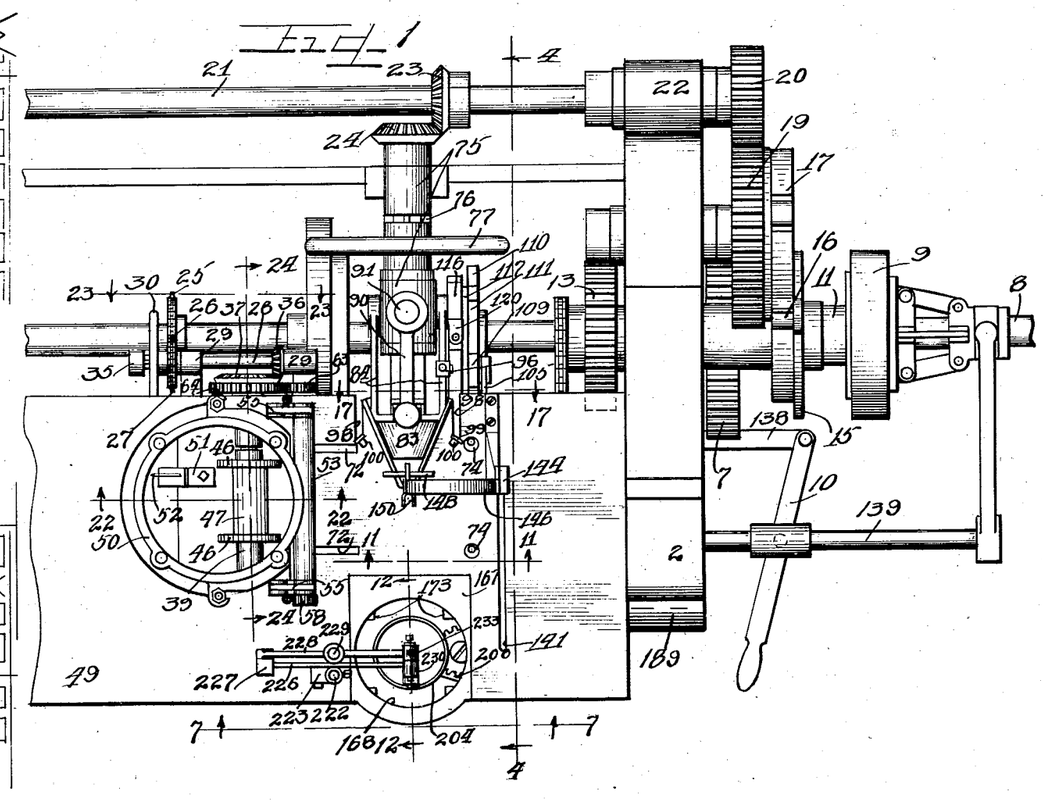
Figure 1 is a top plan view of one of the units of the improved multiple automatic cup forming machine with the master drive shown at the right-hand end thereof.
Figure 2:
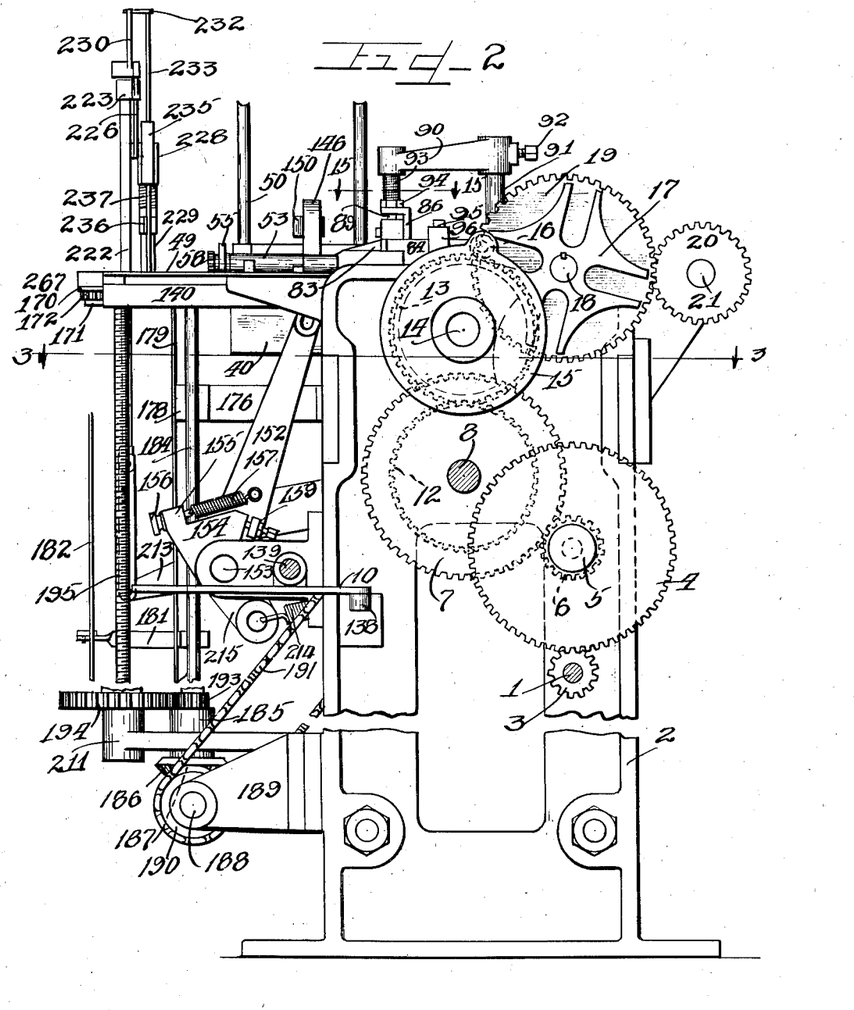
Figure 2 is an end elevation of the driving end of the machine.
Figures 7, 8, 9, 10:
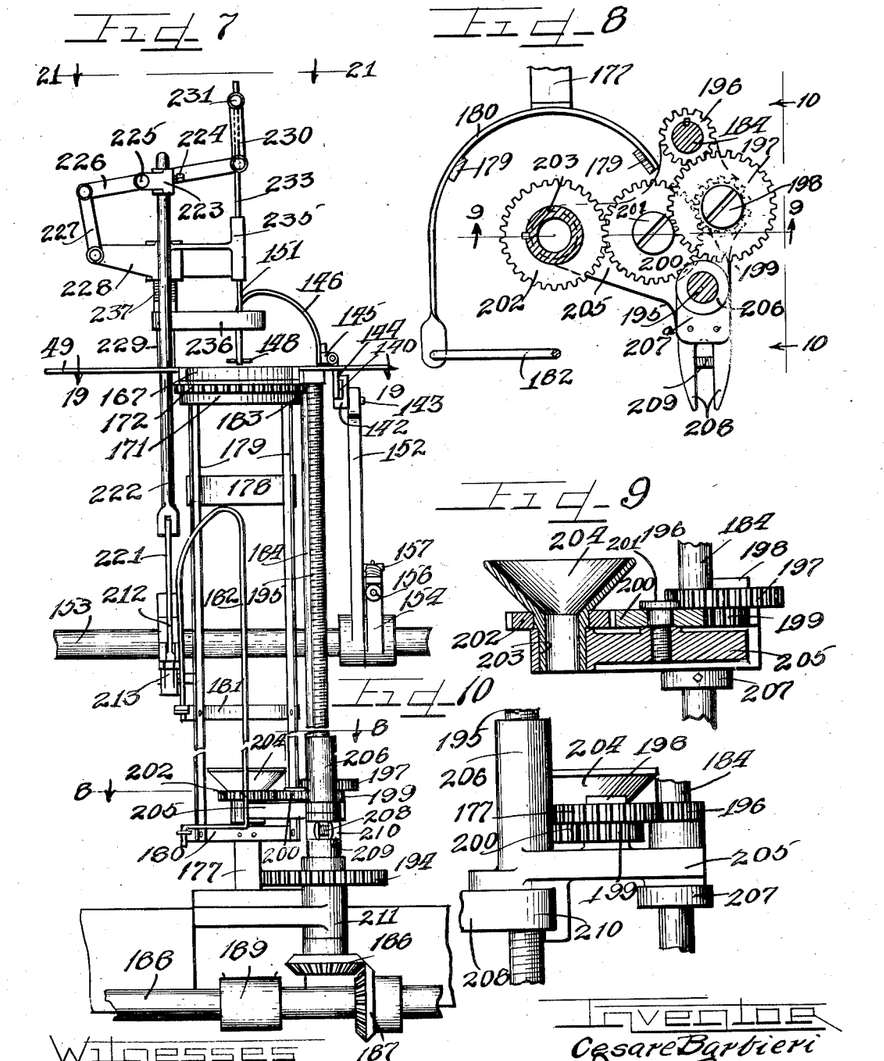
Figure 7 is a fragmentary detail elevational view of the cup stacking attachment taken on line 7—7 of Figure 1 with parts broken away.
Figure 8 is an enlarged fragmentary detail view taken on line 8—8 of Figure 7.
Figure 9 is a fragmentary detail section taken on line 9—9 of Figure 8.
Figure 10 is a fragmentary detail view taken on line 10—10 of Figure 8.

The transfer mechanism is adapted to deliver formed cups from the forming mechanism to an automatic stacking mechanism shown in Figures 2, 7 and 12 as well as in a number of the detailed figures. A formed sundae cup 166 is delivered by the transfer mechanism across the table 49 into the position illustrated in Figure 12 above the stacking mechanism. Supported in an opening in the table 49 is a plate 167 having a circular opening 168 therein through which the formed cups are adapted to be delivered. Secured to the bottom of the plate 167 by means of screws 169 or other suitable means are a pair of segment shaped retaining rails or guide segments 170 which serve as supports for a rotatable peripherally grooved cup receiving sleeve 171 having an external peripheral gear 172 formed thereon. Integrally formed on the inner face of the sleeve 171 are a plurality of pairs of ribs 173 between each pair of which a plate 174 is secured. The upper end of each plate 174 is tapered and bent inwardly and downwardly to afford an inclined spring tongue or finger 175.

Rigidly secured to the front of the machine frame are upper and lower brackets 176 and 177. Fastened to the upper bracket 176 is a curved arm 178 to which two vertical cup guide rods or bars 179 are secured. The lower ends of the guide bars 179 are secured to a curved arm 180 mounted on the lower bracket 177. Fastened to the guide bars 179 is an intermediate curved arm 181 on one end of which the upper arm of a swinging cup guide bar or rod 182 is pivotally supported. The lower end of the pivoted guide bar 182 is pivoted on one end of the lower bracket arm 180.

Meshing with the upper gear 172 is an upper pinion 183 which is keyed on the upper end of a vertical shaft 184. The lower portion of the shaft 184 is journalled in a bearing bracket 185 and has a beveled gear 186 fixed on the end thereof below said bearing bracket. The beveled gear 186 is in mesh with a beveled gear 187 keyed on a long horizontal shaft 188 supported in bearing brackets 189 mounted on the machine frame. The shaft 188 has a sprocket wheel 190 fixed thereon over which an endless chain 191 is trained. The chain 191 is also trained around a sprocket wheel 192 mounted on the cam shaft 8.

Fixed on the vertical shaft 184 directly above the bearing 185 is a pinion 193 which meshes with a gear 194 secured near the lower end of a vertical feed screw 195. Slidably mounted on the vertical shaft 184 is a pinion 196 which meshes with a gear 197 fixed on a vertical idler pin or stub shaft 198. Fixed on the idler shaft 198 below the gear 197 is a pinion 199 meshing with an intermediate idler gear 200 rotatable on a vertical pin 201. The intermediate gear 200 is in mesh with a gear 202 keyed on the cylindrical stem or shank 203 of a conical cup holder 204. The holder stem 203 is rotatably seated in a vertically adjustable carriage 205 slidable on the vertical guide shaft 184. Integral with the carriage 205 is a vertical collar or sleeve 206. A stop ring 207 is fixed on the lower portion of the vertical shaft 184 to limit the downward movement of the carriage. An extension 207ª is integrally formed on the carriage 205 and pivoted on said extension are a pair of handles 208 separated by a coiled spring 209. Threaded half nut members 210 are formed on the handles 208 and are held in threaded engagement with the feed screw 195 by the spring 209. The lower end of the feed screw 195 is journalled in a bearing bracket 211 which is mounted on the machine frame 2.

As shown in Figures 7 and 12, a pusher mechanism is provided whereby the finished sundae cups 166 delivered over the stacker top plate 167 by the transfer mechanism are adapted to be pushed downwardly through the opening 168 and between the spring fingers 175 to seat in the adjustable and rotatable cup holder 204. The pusher mechanism comprises a bell-crank embracing a short arm 212 and a long arm 213. The bell-crank 212—213 is rotatable on the horizontal shaft 153 and has a coiled spring 214 connected to an extension 215 formed on the bell-crank. The other end of the spring 214 is attached to the machine frame 2. Pivoted to the end of the short bell-crank arm 212 is one end of a reciprocating bar 216 having a longitudinal slot 217 therein through which the cam shaft 8 projects. Rotatably mounted on one side of the reciprocating bar 216 is a roller 218 (Figure 5) which is adapted to track in a cam groove 219 formed in a cam disk 220 fixed on the cam shaft 8. Pivoted to the long bell-crank arm 213 is the lower end of a connecting rod or toggle 221. The upper end of the connecting rod 221 is pivoted to the lower end of a vertical rod or shaft 222. The shaft 222 slidably projects upwardly through an opening in the table 49 and has a collar 223 secured near the upper end thereof by means of a set screw 224. Supported by the collar 223 is a pin 225 on which a beam 226 is fulcrumed intermediate its ends. Pivoted to one end of the fulcrumed beam 226 is the upper end of a link 227, the lower end of which is pivoted to one end of a stationary bracket 228 secured upon the upper end of a vertical standard or post 229 mounted on the table 49. Pivoted to the other end of the fulcrumed beam 226 is the lower end of an upwardly directed link 230. The upper end of the link 230 supports a pin 231 on which a collar 232 is supported. Projecting through an opening in said collar 232 is the upper end of a cup push rod 233 secured to said collar by a set screw 234. The push rod is slidable in a guide sleeve 235 integrally formed on the bracket 228. Engaged on the post 229 below the sleeve 235 is a cup stop spring 236 resiliently held in stop position by a coiled spring 237 engaged around the post 229.

Figure 3:
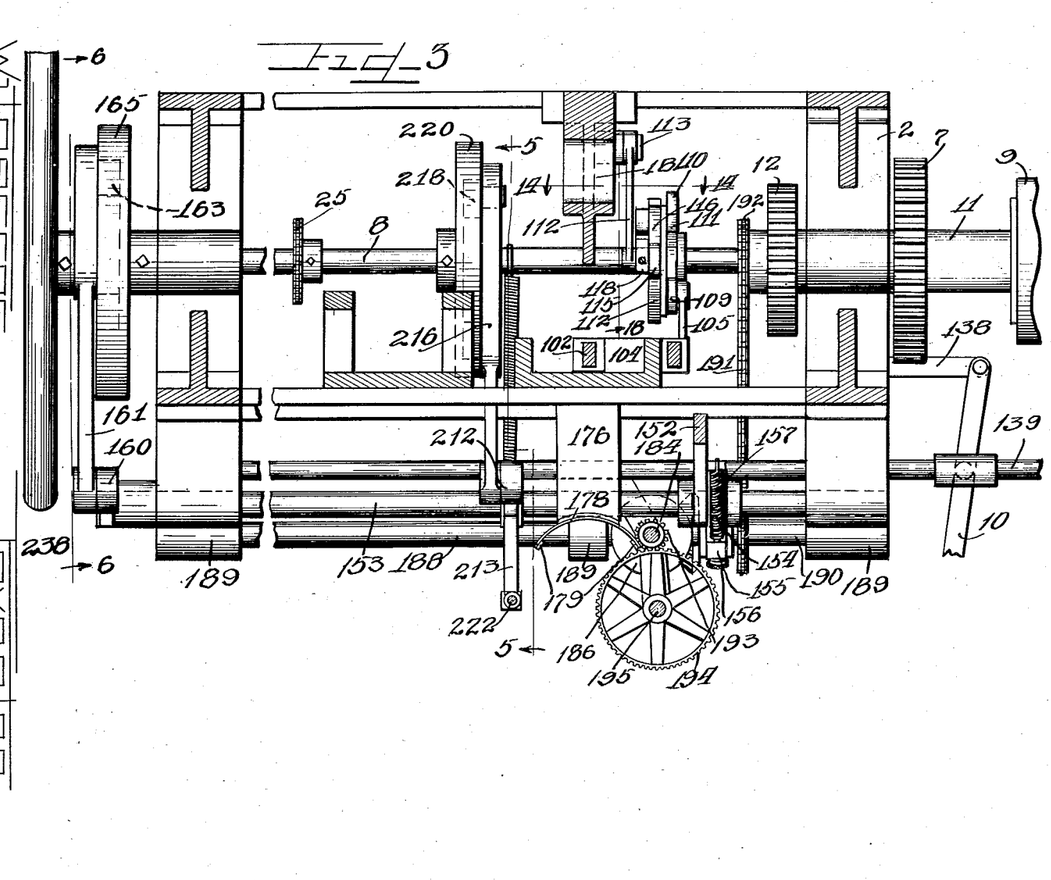
Figure 3 is a sectional view taken on line 3—3 of Figure 2 with parts shown in elevation.

For the purpose of manually rotating the cam shaft 8 a hand wheel 238 (Figure 3) is mounted on each end of said cam shaft.

The operation is as follows:

The machine is operated by rotating the driving shaft 1 by any suitable driving mechanism whereby the drive is transmitted from the pinion 3, gear 4 and pinion 5 to the large gear 7. The clutch control handle 10 is then actuated to throw in the clutch 9 to cause operation of the cup making unit. A number of similar units are connected to form a multiple machine, each unit of which is provided with a clutch control handle 10 so that the various units may be started by the operation of any one of said control handles. The operation will be confined to one unit.

The clutch 9 being mounted on the cam shaft 8, causes rotation of said shaft when the clutch is operated. Rotation of the cam shaft 8 causes rotation of the gears 12 and 13 which in turn impart a drive to the disk 15, the roller 16 of which operates the four-point Geneva gear 17. By means of the meshing gears 19 and 20, the shaft 21 together with the beveled gear 23 is intermittently rotated a quarter of a revolution with each complete revolution of the disk 15. At the same time the cam shaft 8 by means of the chain 26 and the beveled pinion 36 drives the beveled gear 37 and the blank feeding mechanism which continuously delivers prepared sundae cup blanks of paper to the cup forming device. A stack of prepared cup blanks is positioned in the magazine 50 and the delivery of a cup blank from the bottom of the stack is accomplished by means of the rotatable feed reel 46—47 which carries the friction pad 48. The feed reel is rotated by the beveled gear 37 which rotates the shaft 39 supporting said feed reel. As the feed reel is rotated, the friction pad 48 thereof is moved into contact with the bottom surface of the lowermost cup blank and frictionally slides said lowermost blank from the magazine between the feed rollers 53 and 54. The lowermost blank is thus delivered to the feed rollers and the stack of blanks falls by gravity in the magazine resting on the pin 52.

Referring now to Figures 23 and 24, it will be noted that if at any time it becomes necessary or it is desired to stop the blank feeding mechanism without stopping the entire machine, the hand wheel 30 is manually pushed outwardly from the position shown in Figure 23 against the knob 35 thereby disengaging the pin 33 on the sprocket wheel 27 thereby causing said sprocket wheel 27 to idle on the shaft 28 whereby the blank feeding mechanism is stopped. Another arrangement is provided for stopping the blank feed mechanism and this is accomplished by manually pulling the rod 41 by means of the knob or handle 42 outwardly with respect to the shaft 39 thus moving the driving pin 43 out of driving engagement with the pin 45 on the feed reel 46—47. The manual feed stop mechanisms are conveniently positioned so that the blank feed mechanism may be readily stopped from the front or from the back of the machine.

With the pin 43 and the hand wheel 30 in driving positions, as illustrated in Figures 24 and 23, a cup blank is fed from the magazine between the auxiliary feed rollers 53 and 54. The lower roller 54 is operated by means of the gears 64, 63, 62 and 61, while the upper roller 53 is operated by the gears 59 and 58. A cup blank fed between the rollers 53 and 54 by the friction feed reel is thus advanced by said rollers onto the table 49. As the above feeding operation takes place, the spring 239 (Figure 23) has acted to return the pusher arms 71 into retracted position engaged in the grooves 73 of the lower feed roller 54. After the cup blank has been sufficiently advanced through the feed rollers 53 and 54, the pusher arms 71 are actuated by means of the cam 65 which coacts with the roller 66 on the arm 67 to cause said arm to slide away from the shaft 39. The crank 68 thus acts to partially rotate the shaft 69 to cause the pusher arms 71 to swing upwardly through the table slots 72 and engage and push the blank forwardly up over the inclined face 137 of the block 136 and against the stops 74. As the pusher arms 71 push the blank against the stops 74, the positioning heads 99 on the arms 97 are actuated in the table slots 98 and move inwardly to cause the pins 100 to further position and center the cup blank on the table in the field of operation of the cup forming mechanism. The positioning arms 97 are carried by the arm 102 secured on the shaft 103. The shaft 103 is rocked or partially rotated by means of the bell-crank 105, the roller 109 of which coacts with the cam 110 mounted on the cam shaft 8.

The gripper plates 81 are separated during the time the cup blank is being positioned; this separation is accomplished by raising the forming member 83 about its pivot point 87 by means of the cam 116 which acts on the roller 115 to raise the bar 118 and the rod 119 carried thereby. Elevation of the rod 119 causes the end 122 of the fulcrumed arm 123 to move upwardly thereby forcing the boss 125 against the shoe 96. The shoe 96 being mounted on one of the former arms 84 thus causes elevation of the forming member 83 and compression of the spring 93 and at the same time separates the gripper plates 81 against the tension of the spring 82.

When the point 240 of the cam 116 reaches the roller 115, the forming member 83 is permitted to be gradually lowered and the gripping plates are caused to close by the spring 82 to engage the centered cup blank therebetween.

The action of the disk 15 and its roller 16 upon the Geneva gear 17 now commences and the gripping plates 81 are thus rotated through a half revolution to fold the blank into the form of a conical sundae cup. After the forming of the cup as described, the projection 241 (Figure 18) comes into engagement with the roller 115 to raise the forming member 83 and separate the gripping plates. While the gripping plates are being separated by the action of the cam projection 241, the cam 165 on the cam shaft 8 actuates the bar 161 and the crank arm 160 whereby the shaft 153 and the bracket member 154 cause the lever 152 to lower and advance the arched arm 146 from its innermost position a short distance to cause the cup engaging bar 148 to engage in the formed cup to center the cup and advance the same a slight distance away from the former 83 and the gripping plates 81. With the formed cup partially removed from the forming mechanisms, the continued rotation of the cam 116 brings one arm of the bell-crank 183 into engagement with the curved shoe 131 of the bar 130 carried by the bar 118. As the bell-crank arm 132 passes the shoe 131, said shoe is adapted to suddenly drop off of said arm thereby permitting the compressed spring 82 and the compressed presser arm spring 129 to clamp the folded portions of the cup to crease the same. The forming member 83 and the presser arm 126 act to clamp one side of the folded portion of the cup while the other side of said folded portion is clamped between the forming member and the table 49. The cup is thus formed and creased ready to be delivered to the stacking attachment.

The continued rotation of the cam 165 continues to swing the lever 152 outwardly to move the cup transfer mechanism 146 from the position illustrated in Figure 4 outwardly into the position shown in Figure 12. The formed cup 166 is thus transferred from the forming mechanisms over the table 49 into a position over the stacking mechanism properly centered by the cross bar 148.

When the cup is advanced over the stacking mechanism the pusher rod 233 is elevated to permit the cup to be pushed against the light plate spring 236. As the cup is pushed against the spring 236, the rod 233 is lowered through the guide fork 150 on the arched arm 146.

The stacking mechanism is operable by means of the cam 220 on the cam shaft 8. The roller 218 acting in the cam groove 219 causes the bar 216 to actuate the bell-crank 212—213 (Figure 5) whereby the connecting rod 221 tends to pull the shaft 222 downwardly. The fulcrumed arm or beam 226 is thus lowered causing the link 230 to force the pusher rod 233 downwardly into the apex of the cup 166 thereby pushing the cup from the position illustrated in Figure 12 down through the plate opening 168 between the resilient retaining members 175. The formed cup is thus delivered to seat in the conical holder 204 and is prevented from springing out of said holder by the retainers 175.

The formed cups are thus automatically pushed into the stacking mechanism to seat one within the other supported by the holder 204 between the guide bars 179 and 182. Each time a cup is delivered into the stacking mechanism, the holder is lowered a predetermined amount and partially rotated whereby the cups are stacked with the folded portions thereof staggered as illustrated in Figure 12 to produce a stack of cups which will be straight and will not tend to bend or curve to one side as is the case when folded cups are stacked with the folded portions thereof disposed one above the other.

When a stacking operation is to be started, the operator grips the handles 208 forcing the same together thereby moving the nut portion thereof out of threaded engagement with the feed screw 195. The carriage 205 is now raised on the guide shaft 184 to its uppermost position below the geared collar 171 and the handles 208 are released permitting the spring 209 to move the nut segments back into threaded engagement with the feed screw 195. The stacking device holder mechanisms are operated by the chain 191 which receives a drive from the cam shaft 8 and rotates the lower horizontal shaft 188. The drive is transmitted by the beveled gears 187 and 186 to the vertical shaft 184 on which the pinions 183, 196 and 193 are mounted. There is a four to one ratio between the gear 194 and the pinion 193, between the upper gear 172 and the upper pinion 183 and between the gear 197 and the pinion 196 so that with each revolution of the shaft 188, the feed screw 195 is rotated one quarter of a revolution as is also the cup receiving collar 171 and the cup holder 204. It will thus be noted that the carriage 205 is gradually lowered while the pinions 183 and 196 respectively cause rotation of the collar 171 and the conical cup holder 204. The cups pushed through the collar 171 between the resilient members 175 are thus seated one within the other with the folded portions of adjacent cups disposed ninety degrees apart (see Figure 12). When a cup is pushed into the stacker, the stack of cups already delivered to the holder 204 is compressed until the cup being delivered passes beneath the resilient retainer member 175. When this occurs, the spring action of the folded portions of the stacked cups comes into play and acts to spring the cups upwardly beneath the resilient members 175 which thus serve to hold the cups stacked and prevents the upper cups of the stack from springing out of seated engagement with one another.

The stacked cups are held in alignment by the stationary guide bars 179 and by the swinging guide member 182. When a stack of cups has reached a desired height, the machine is stopped and the movable guide rail or rod 182 is swung outwardly to permit the stack of formed cups to be removed from the holder 204 either by hand or by means of a stack holder adapted to be used to transfer the stack of cups from the stacking attachment to cartons ready for shipment.

From the description hereinbefore given, it will be seen that the improved sundae cup forming machine of this invention is adapted to automatically feed cup blanks into proper centered relation on the machine table with respect to a forming mechanism which acts automatically to fold and crease the blanks to form conical sundae cups which, when formed, are adapted to be engaged by a transfer or discharge mechanism which acts automatically to transfer the formed cups from the forming mechanism to the automatic stacking attachment which then acts to push the cups into a rotatable and slidable holder between suitable guides and below resilient retaining means which serves to hold the stacked cups properly seated one within the other with the folded portions of said cups staggered.

While the operation of only one unit of the machine has been described, it will of course be understood that any desired number of units may be used or operated from the common driving mechanisms. The hand wheels 238 at the ends of the cam shaft 8 permit manual adjustment of said shaft.

I am aware that numerous details of construction may be varied through a wide range without departing from the principles of this invention, and I therefore do not purpose limiting the patent granted, otherwise than necessitated by the prior art.

I claim as my invention:

1. A cup forming machine comprising an automatic cup forming mechanism, a mechanism for automatically feeding cup blanks into the field of operation of said forming mechanism to be formed into cups, means for automatically centering the cup blanks, an automatic cup stacking mechanism, means for automatically transferring the formed cups from the forming mechanism over said stacking mechanism, and means for automatically pushing the cups into said stacking mechanism.

2. In a cup forming machine, the combination with a driving means, of a forming device driving mechanism, a feeding device driving mechanism, a stacking device driving mechanism, and means connecting all of said driving mechanisms with the driving means.

3. In an automatic cup forming machine, the combination with an intermittently operated forming means, a manually adjustable timing means forming a part thereof, gripping members adapted to grip a blank and fold the same to form a cup, means for removing a cup from the forming means, a holder, and means for pushing the cup into said holder.

4. In an automatic cup forming machine, the combination with a driving means, said driving means including a manually adjustable timing mechanism, gripping means adapted to grip a blank and turn a portion of the same through a part of a revolution to form a cup, a forming means cooperating with said gripping means, a cup holder, means for pushing a cup into said holder, and mechanisms for lowering and rotating said holder.

5. In a cup forming machine, the combination with a cup forming mechanism, of a slidable and rotatable mechanism operated by the machine for receiving the formed cups.

6. The combination with a cup forming machine, of means connected to be actuated by the machine to receive a cup and automatically lower and rotate the same.

7. The combination with a cup forming machine, of cup guides, a movable member therebetween, and a holder on said member adapted to lower and rotate as cups are delivered thereto.

8. The combination with a cup forming machine, of an automatic stacking attachment operable from the machine for automatically stacking cups with the folded portions of adjacent cups staggered.

9. The combination with a cup forming machine, of rotatable means operable from the machine for receiving the discharged cups.

10. The combination with a cup forming machine, of rotatable means operable from the machine for receiving and stacking cups, and stationary and movable guides for the stacked cups.

11. The combination with a cup forming machine, of rotatable means operable from the machine for receiving and stacking cups, stationary guides for the stacked cups, and a movable guide adapted to be moved to permit the stacked cups to be removed from said rotatable means.

12. The combination with a cup forming machine, of a carriage, means operable from the machine for moving said carriage, a cup holder supported on said carriage to receive cups from the machine, and means operable from the machine for rotating said holder as the cups are delivered thereto.

13. The combination with an automatic cup forming machine, of cup formers thereon, a rotatable receptacle for receiving the completed cups, means for transferring the cups from said cup formers to said rotatable receptacle, and means operated from the machine for lowering the rotatable receptacle as the cups are delivered thereto.

14. The combination with a cup forming machine, of cup formers thereon, a holder for receiving the completed cups, means operable from the machine for delivering the cups from the cup formers over said holder, a cup retaining mechanism, and means operable from the machine for forcing the cups through said retaining mechanism into said holder, said retaining mechanism serving to hold the cups properly nested one within the other on said holder.

15. The combination with a cup forming machine, of a holder for receiving the completed cups, means for simultaneously lowering and rotating said holder as the cups are delivered thereto, and resilient means for holding the cups against separation due to the spring action of the folded portions of said cups.

16. In a cup forming machine, the combination with a carriage, means for moving the same, a cup holder rotatably supported in said carriage, means for rotating said holder, and means for delivering cups to said holder.

17. In a cup forming machine, the combination with a cup forming mechanism, means for feeding the cup blanks thereto, a rotatable member, cup retaining means therein, a transfer mechanism for moving completed cups from the forming mechanism over said rotatable member, and a mechanism operable from the machine for pushing the completed cups into said rotatable member below said retaining means.

18. In a cup forming machine, the combination with a cup forming mechanism, a rotatable member, cup retaining means therein, a transfer mechanism for moving completed cups from the forming mechanism over said rotatable member, a mechanism operable from the machine for pushing the completed cups through said rotatable member and below said retaining means, and a rotatable vertically adjustable holder for receiving the cups to stack the same.

19. The combination with a cup forming machine, of a cup stacking attachment operated thereby adapted to receive folded cups and rotate the same so that the folded portions of the cups will be offset with respect to one another.

20. In a cup forming machine, the combination with a forming mechanism, of a cup receiver, means operated by the machine for delivering cups from the forming mechanism to said receiver, a carriage for supporting said receiver, means operated from the machine for lowering said carriage as the cups are delivered to said receiver, and mechanisms on said carriage operated from the machine for rotating the receiver as it is lowered.

21. The combination with a cup forming machine, of a cup stacking attachment operated thereby and comprising a plate having an opening therein, a collar rotatably supported on said plate, a gear formed on said collar, a drive shaft, means for operating the same from the machine, a gear on said drive shaft meshing with said collar gear, a carriage slidable on said drive shaft, a cup holder rotatably supported on said carriage, a train of gears connecting said cup holder with said drive shaft, a feed screw, means for operating the same from said drive shaft, and means on said carriage adapted to engage said feed screw.

22. The combination with a cup forming machine, of a cup stacking attachment comprising a stationary plate having an opening therein for receiving cups, a collar rotatably supported on said plate, resilient cup retaining members in said collar, a gear formed on said collar, a drive shaft, a gear on said drive shaft meshing with said collar gear, a carriage slidable on said drive shaft, a cup holder rotatable on said carriage, means connecting said cup holder with said drive shaft to be rotated thereby, a feed screw, means for rotating the same from the drive shaft, manually releasable means on said carriage engaged with said feed screw to permit lowering of the carriage as cups are delivered to said holder, and driving connections between said drive shaft and the machine.

23. The combination with a cup forming machine, of a cup stacking attachment connected therewith and operated thereby, means for delivering cups from the machine over said stacking attachment, a cam mechanism operated from the machine for actuating the cup delivery means, a reciprocating mechanism for pushing the delivered cups into the stacking attachment, and a second cam mechanism operated from the machine for actuating the reciprocating mechanism.

24. The combination with a cup forming machine, of a cup stacking mechanism connected therewith and operated thereby, a resilient cup stop over said cup stacking mechanism, cam operated means for transferring formed cups from the machine to said stacking mechanism against the resilient stop, and a cam controlled reciprocating mechanism operable from the machine for engaging the cups held against said resilient stop to push said cups into the stacking mechanism.

25. In a cup forming machine, the combination with a cup stacking mechanism, of means forming a part thereof through which cups are adapted to be pushed and against which said cups are adapted to be sprung by their own resiliency.

26. The combination with a cup forming machine, of a rotatable receding cup holder operable by the machine for receiving discharged cups.

27. The combination with a cup forming machine, of a rotatable cup holder operable from the machine for receiving discharged cups in stacked relation, and rotatable means operable from the machine against which the stacked cups are adapted to press.

28. The combination with a cup forming machine, of a resilient cup stop, and means operated from the machine for delivering formed cups against said resilient stop.

29. The combination with a cup forming machine, of a cup receiving mechanism, a resilient cup stop over said receiving mechanism, means operated from the machine for centering the cups and delivering the same against said stop, and means operated from the machine for pushing the cups into said receiving mechanism against the action of said resilient stop.

30. The combination with a cup forming mechanism, of a cup receiving mechanism, a resilient cup stop over said receiving mechanism, means operated from the machine for centering the cups and delivering the same against said resilient stop, reciprocating means operable from the machine for pushing the cups into the receiving mechanism against the action of said resilient stop, and guide means for said reciprocating means carried by the cup delivering and centering means.

31. In a cup forming machine, the combination with a cup stacking mechanism operated thereby, of means operated by the machine adapted to project into said stacking mechanism to deliver cups thereto.

32. The combination with a cup forming machine, of a table forming a part thereof and having an opening therein, means operated from the machine for pushing cups over said table to a position over said opening, and a mechanism operated by the machine adapted to project into the apex of the cups for pushing said cups through said opening.

33. The combination with a cup forming machine, of an apertured table, mechanisms operated by the machine for pushing cups across the table, and means for pushing the cups downwardly through the apertured table.

34. In a cup forming machine, the combination with a driving means, of a blank feeding device, a feeding device driving mechanism, a cup forming device, a forming device driving mechanism, a cup stacking device, a stacking device driving mechanism, and means connecting all of said driving mechanisms with the driving means.

35. In a cup forming machine, the combination with a driving means, of a cup forming device, a forming device driving mechanism, a cup stacking device, a stacking device driving mechanism, and means connecting the driving mechanisms with the driving means.

36. In an automatic cup forming machine, the combination with a driving means, said driving means including a manually adjustable timing mechanism, gripping means adapted to grip a blank and turn a portion of the same through a part of a revolution to form a cup, a forming means co-operating with said gripping means, a cup holder, means for transferring the cup from the gripping means and centering the cup above said holder, means for pushing the centered cup into said holder, and mechanisms for lowering and rotating said holder.

In testimony whereof I have hereunto subscribed my name in the presence of two subscribing witnesses.

CESARE BARBIERI.

Witnesses:
M. A. GIBLIN,
R. I. JOHNSON.